United States Patent Office 2,855,408
Patented Oct. 7, 1958

2,855,408
PREPARATION OF PYRANTHRONE

William Dettwyler, Hockessin, Del., assignor to E. I. du Pont de Nemours and Company, Wilmington, Del., a corporation of Delaware No Drawing. Application January 17, 1957
Serial No. 634,626

5 Claims. (Cl. 260—360)

This invention is directed to a process for the ring closure of 2,2'-dimethyl-1,1'-dianthraquinonyl to pyranthrone, a known vat dye, by means of aqueous alkalies. The novel use of water in this process affords a milder ring closure with resulting significant advantages of increased purity.

U. S. Patent 856,811 (1907) discloses the ring closure of 2,2'-dimethyl-1,1'-dianthraquinonyl to pyranthrone in anhydrous alcoholic KOH followed by aeration of the leuco form of the vat dye in water. An alternate process is disclosed in Example 2 of the patent which specifies boiling the dianthraquinonyl compound in 50% aqueous KOH. It has been found that said alternate process will not ring-close the dianthraquinonyl to pyranthrone.

It is an object of the present invention to provide a novel process for the ring closure of 2,2'-dimethyl-1,1'-dianthraquinonyl to pryanthrone of increased purity. It is a further object of this invention to accomplish this result of increased purity by way of an economically attractive process.

More specifically, the present invention is directed to an aqueous ring closure process whereby 1 part of 2,2'-dimethyl-1,1'-dianthraquinonyl is heated at 110° to 160° C. in the presence of at least 1 part of NaOH, KOH or $K_2CO_3$, the alkali being dissolved in water to a concentration of at least 30% and the minimum amount of water being that amount which is sufficient to afford a fluid reaction mass at the reaction temperature, and in the presence of at least 0.1 part of an organic hydroxy compound, or one that is converted in the process to a hydroxy compound, which hydroxy compound serves as a reducing agent in the system, and continuing the heating until essentially all of the quinonyl starting material has been ring-closed to pyranthrone.

The present invention is illustrated by the following reaction:

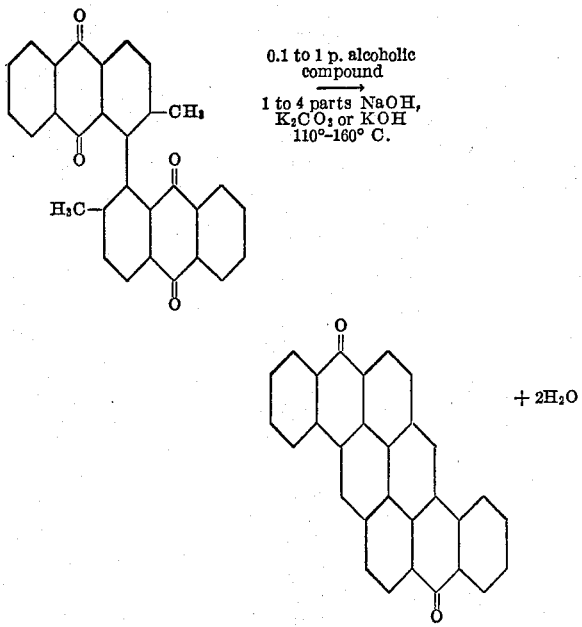

0.1 to 1 p. alcoholic compound
1 to 4 parts NaOH, $K_2CO_3$ or KOH
110°–160° C.

$+ 2H_2O$

The following examples illustrate the present invention:

Example 1

(a) 50 parts of water were added to 200 parts of NaOH and the 80% aqueous caustic was liquified by warming to 70° C. Then 10 parts of beta-methoxymethoxyethanol were added and the melt was heated to 100° C. 50 parts of 2,2'-dimethyl-1,1'-dianthraquinonyl were added to the agitated hot melt over a period of 10 to 15 minutes, after which the fusion mass was heated to 150° C. and agitated at this temperature for 1 hour. The mass was then drowned into 2000 parts of water, filtered, and the filter cake was washed free of alkali and dried. The pyranthrone was thus obtained in quantitative yield. It was acid pasted from sulfuric acid in the usual manner. The acid pasted color dyed cotton from an alkaline hydrosulfite vat in a bright orange shade.

When the NaOH used in the process of this example was replaced by 200 parts of KOH, the same results were obtained.

(b) When the process of part (a) was repeated except that the 250 parts of 80% aqueous NaOH were replaced by 190 parts of 70% aqueous NaOH, and 20 parts of betamethoxymethoxyethanol were employed, similar results were obtained.

Example 2

One (1) part of 2,2'-dimethyl-1,1'-dianthraquinonyl was added to an agitated solution of 3 parts of 50% aqueous NaOH and 0.5 part of 2-ethoxyethanol at 60° C. The mixture has heated to 128° to 130° C. and agitated at that temperature for 4 hours. The fusion mass was drowned into 30 parts of water, heated to the boil, filtered and the filter cake was washed free of alkali. A quantitative yield of pyranthrone was obtained and the color dyed cotton from an alkaline hydrosulfite vat in a bright orange shade.

Example 3

Other fusion conditions, otherwise following the procedure of Example 1, giving excellent results were employed as tabulated below. All parts are based on 1 part of 2,2'-dimethyl-1,1'-dianthraquinonyl:

| | Parts and Conc. of Aqueous Caustic | Parts of Hydroxy Compound | Fusion | |
|---|---|---|---|---|
| | | | Temp., °C. | Time, Hrs. |
| (a) | 4 of 33% NaOH | 0.5 of monomethylether of diethylene glycol | 121 | 4 |
| (b) | 4 of 50% NaOH | 0.5 of diethylene glycol | 140 | 4 |
| (c) | 5 of 80% NaOH | 0.2 of beta-ethoxyethanol | 150 | 1 |
| (d) | 3 of 66% $K_2CO_3$ | 1.0 of beta-ethoxyethanol | reflux | 4 |

Example 4

Twenty (20) parts of 2,2'-dimethyl-1,1'-dianthraquinonyl were added to an agitated solution of 67 parts of 30% aqueous NaOH and 45 parts of 2-ethoxyethanol at 80° C. The mixture was agitated at reflux temperature (118° C.) for 12 hours during which time the quinonyl was converted to pyranthrone which appeared, under the microscope, as brown crystals. The reaction mass was diluted with 150 parts of water, filtered and the filter cake was washed with water until free of alkali. The pyranthrone thus obtained was dried, acid-pasted and dyed on cotton, giving a bright orange shade.

Example 5

A mixture consisting of 1 part of 2,2'-dimethyl-1,1'-dianthraquinonyl, 8 parts of 50% aqueous NaOH, 0.5 part of phenol and 0.5 part of mixed cresols was heated and agitated at 135° C. for 2 hours. The reaction mass was then diluted with 35 parts of water and the pyranthrone obtained was isolated and tested as described in Example 1. Strong and bright orange shades were obtained on cotton.

In the present invention the following alcoholic compounds may be substituted to achieve substantially the same results of high purity of product and economy: The monohydric alcohols, n-butanol, n-hexanol, isoamyl alcohol and benzyl alcohol; the dihydric alcohols, glycol, diethylene glycol, polyethylene glycols; the monoalkyl ethers of the mono- and di-ethylene glycols such as the monomethyl, ethyl, propyl and butyl ethers of mono- and diethylene glycol; the substituted ether alcohol, methoxymethoxy-ethanol; the sugar alcohols, glucose, fructose and sucrose. Other compounds found to be operable include: starch, phenol, cyclohexanol, 1- and 2-naphthol, mono-, di- and tri-ethanolamines, ethylacetoacetate, acethophenone, benzophenone and pyrrolidone.

It is believed that any organic hydroxy compound will be operable if said compound reduces the quinonyl under the conditions in the defined system.

In the examples, 0.2 to 2.25 parts of the hydroxy compound per part of quinonyl are utilized; larger amounts are operable but not economically atractive. The preferred limits of hydroxy compounds are 0.2 to 0.5 part per part of quinonyl.

In the examples, 1 to 4 parts of 100% alkali per part of quinonyl is utilized; larger amounts may be used but are uneconomical, the preferred limits are 1.5 to 2.5 parts and the preferred concentrations of aqueous alkali are 55–75%.

The present process provides significant advantages over existing processes of ring closure in that higher color yields per unit volume of equipment, lower cost of reactants, and, a resulting higher purity of pyranthrone are achieved.

I claim:

1. An aqueous ring closure process wherein 1 part of 2,2'-dimethyl-1,1'-dianthraquinonyl is heated at 110° to 160° C. in the presence of at least 1 part of an alkali taken from the group consisting of NaOH, KOH and $K_2CO_3$, said alkali being dissolved in water to a fluid reaction mass concentration of at least 30%, and, in the presence of at least 0.1 part of an organic hydroxy compound reducing agent and continuing said heating until essentially all of said quinonyl starting material is ring-closed to pyranthrone.

2. The process of claim 1 conducted in the presence of from 0.1 to 3 parts of an organic alcoholic reducing agent.

3. The process of claim 1 wherein the alcoholic reducing agent is an alcohol-alkyl ($C_{1-4}$) ether.

4. The process of claim 1 wherein the reducing organic hydroxy compound is present as 0.3 to 3 parts of a sugar.

5. An aqueous ring closure process wherein 1 part of 2,2'-dimethyl-1,1'-dianthraquinonyl is heated at 110° to 160° C. in the presence of at least 1 part of an alkali taken from the group consisting of NaOH, KOH and $K_2CO_3$, said alkali being dissolved in water to a fluid reaction mass concentration of at least 30%, and, in the presence of at least 0.1 part of an organic hydroxy compound reducing agent and continuing said heating until essentially all of said quinonyl starting material is ring-closed to pyranthrone, followed by the steps of drowning in water, air blowing to oxidize the leuco to the keto form of the vat dye and filtering off the pyranthrone product.

References Cited in the file of this patent

UNITED STATES PATENTS

| | | |
|---|---|---|
| 856,811 | Scholl | June 11, 1907 |
| 2,405,702 | Lee et al. | Aug. 13, 1946 |